United States Patent [19]

Bellovin et al.

[11] Patent Number: 5,241,599
[45] Date of Patent: Aug. 31, 1993

[54] CRYPTOGRAPHIC PROTOCOL FOR SECURE COMMUNICATIONS

[75] Inventors: Steven M. Bellovin, Westfield; Michael Merritt, Berkeley Heights, both of N.J.

[73] Assignee: AT&T Bell Laboratories, Murray Hill, N.J.

[21] Appl. No.: 770,064

[22] Filed: Oct. 2, 1991

[51] Int. Cl.$^5$ .............................................. H04L 9/00
[52] U.S. Cl. ...................................... 380/21; 380/30; 380/44; 380/28
[58] Field of Search .................... 380/44, 21, 30, 28

[56] References Cited

U.S. PATENT DOCUMENTS 4,193,131 3/1980 Lennon et al. ................... 380/44

OTHER PUBLICATIONS

J. J. Tardo and K. Alagappan, "SPX: Global Authentication Using Public Key Certificates," *Proc.* 1991 *IEEE Computer Society Symposium, Research in Security and Privacy*, pp. 232-244 (May 1991).

R. M. Needham and M. D. Schroeder, "Using Encryption for Authentication in Large Networks of Computers," *Communications of the ACM*, vol. 21, No. 12, 993-999 (Dec. 1978).

J. Steiner, C. Neumann, and J. I. Schiller, "Kerberos: An Authentication Service for Open Network Sytems," *Proceedings USENIX Winter Conference*, Dallas, Texas, pp. 191-202 (Feb. 1988).

W. Diffie and M. E. Hellman, "New Directions in Cryptography," *I.E.E.E. Transactions on Information Theory*, vol. IT-22, No. 6, pp. 644-654 (1976).

W. Diffie and M. E. Hellman, "Privacy and Authentication: An Introduction to Cryptography," *Proceedings of the I.E.E.E.*, vol. 67, No. 3, pp. 397-427 (Mar. 1979).

S. M. Bellovin and M. Merritt, "Limitations of the Kerberos Authentication System," *Proceedings USENIX Winter Conference*, Dallas, Texas (1991).

T. M. A. Lomas, L. Gong, J. H. Saltzer and R. M. Needham, "Reducing Risks from Poorly Chosen Keys," *Proceedings of the Twelfth ACM Symposium on Operating Systems Principles, SIGOPS*, pp. 14-18 (Dec. 1989).

L. Gong, "Verifiable-Text Attacks in Cryptographic Protocols," *Proceedings of the I.E.E.E. INFOCOM-The Conference on Computer Communications*, San Francisco, California (Jun. 1990).

*Primary Examiner*—David Cain
*Attorney, Agent, or Firm*—Jason P. DeMont

[57] ABSTRACT

A cryptographic communication system. The system, which employs a novel combination of public and private key cryptography, allows two parties, who share only a relatively insecure password, to bootstrap a computationally secure cryptographic system over an insecure network. The system is secure against active and passive attacks, and has the property that the password is protected against offline "dictionary" attacks. If Alice and Bob are two parties who share the password P one embodiment of the system involves the following steps: (1) Alice generates a random public key E, encrypts it with P and sends P(E) to Bob; (2) Bob decrypts to get E, encrypts a random secret key R with E and sends E(R) to Alice; (3) Alice decrypts to get R, generates a random challenge $C_A$ and sends $R(C_A)$ to Bob; (4) Bob decrypts to get $C_A$, generates a random challenge $C_B$ and sends $R(C_A, C_B)$ to Alice; (5) Alice decrypts to get ($C_A$, $C_B$), compares the first against the challenge and sends $R(C_B)$ to Bob if they are equal; (6) Bob decrypts and compares with the earlier challenge; and (7) Alice and Bob can use R as a shared secret key to protect the session.

42 Claims, 3 Drawing Sheets

CRYPTOGRAPHIC PROTOCOL FOR SECURE COMMUNICATIONS

BACKGROUND OF THE INVENTION

1. Field of the Invention

This invention relates to cryptographic communications in general and, more particularly, to methods and systems for establishing authenticated and/or private communications between parties who initially share only a relatively insecure secret.

2. Description of the Related Art

Parties often wish to conduct private and authenticated communications. While privacy can be sought through physical means it is often more efficient and effective to employ cryptographic means. And while authentication can be sought through physically secure and dedicated facilities, it too can be accomplished more easily with cryptographic techniques.

Using classical cryptographic techniques, a party authenticates himself or herself to another party by revealing knowledge of a secret (e.g., a password) that is known only by the respective parties. When the secret is revealed, especially if it is communicated over a physically insecure communication channel, it is susceptible to eavesdropping. This permits the eavesdropper to learn the secret and to subsequently impersonate one of the parties.

The Kerberos authentication system of MIT's Project Athena attempts to solve this problem in the context of computer networks. R. M. Needham and M. D. Schroeder, "Using Encryption for Authentication in Large Networks of Computers," *Communications of the ACM*, Vol. 21, No. 12, 993–999 December 1978); and J. Steiner, C. Neumann, and J. I. Schiller, "An Authentication Service for Open Network System," *Proc. Winter USENIX Conference*, Dallas, 1988. According to the Kerberos system, each Kerberos system user is given a non-secret unique login ID and is allowed to choose a secret password. The password is conveyed by the user to the Kerberos system and is held in confidence by both parties. Because the password is kept a secret it may be used by the user to authenticate himself to the Kerberos system.

When a Kerberos system user desires access to a Kerberos computer, the user sends his or her login ID to the Kerberos computer with a request for access. While authentication could be accomplished by requiring that the user sends his or her password along with his or her ID, that technique has the serious disadvantage that an eavesdropper could readily ascertain the ID and corresponding password of the user.

To avoid this problem, the Kerberos system authenticates the identity of the user by creating a puzzle that can probably be solved only by the bona fide user. The puzzle can be thought of as a locked box, containing a message, that is secured with a combination lock. The puzzle is constructed by the Kerberos system so that the combination to the combination lock is the secret password known by the bona fide user associated with the received ID. The bona fide user, knowning his or her own password, can use the password to open the lock and recover the message inside. When the combination to the combination lock is randomly selected from a large number of possibilities it is infeasible for an impersonator to "pick" the lock.

The mechanism used to create the puzzle typically uses several steps. First, the Kerberos system generates a random number as the message to be conveyed to the user. Next, the Kerberos system makes a puzzle (containing the random number) such that the user's password is the key to solving the puzzle and recovering the message. For example, suppose that according to one class of puzzles each puzzle is equal to a random number plus a number representing the user's password. When the user's password is 3049 and the random number is 5294 the puzzle is 8343.

The puzzle is transmitted to the user by the Kerberos system. Continuing with the example, the user, knowing his or her own password, solves the puzzle and recovers the message by subtracting his or her password (3049) from the puzzle (8343) to recover the message (5294). An eavesdropper knowing the puzzle (8343) but not knowing the password is unlikely to discover the message. According to the Kerberos system all communications between the user and the Kerberos system after the first puzzle is sent are also in the form of puzzles. But the key to solving the subsequent puzzles is the random number contained in the first puzzle which the Kerberos system and a bona fide user would know. Authentication occurs implicitly when the user and the computer are able to communicate meaningfully. And because all of the communications are encrypted privacy is achieved.

A discussion on the nomenclature of cryptology is appropriate at this time. A class of puzzles is known as a "cryptographic system" or "cryptosystem." The process of making a puzzle is known as "encryption" and the process of solving a puzzle to recover the message inside is known as "decryption." The puzzle is called "ciphertext" and the message within the puzzle is called "plaintext." The members of a cryptosystem are distinguished by a cryptographic key or key. According to the scheme of a particular cryptosystem, a key is used to lock plaintext into ciphertext and is also used to unlock the ciphertext to recove the plaintext.

The key to making a specific puzzle (i.e., locking plaintext in ciphertext) is known as an "encryption key" and the key to solving a puzzle (i.e., recovering the plaintext from the ciphertext) is known as a "decryption key." When, according to the design of a particular cryptosystem, the encryption key and the decryption key are identical, the cryptosystem is known as a "symmetric cryptosystem." The cryptosystem illustrated above is a symmetric cryptosystem because the number 3049 is the key to both creating the puzzle and to solving it.

A cryptosystem that has an encryption key E and a different decryption key D such that it is computationally infeasible to determine D from E is known as an "asymmetric key cryptosystem" or a "public key cryptosystem." An asymmetric key cryptosystem is not a symmetric cryptosystem and is therefore useful for initiating secure communications between parties who typically have not previously communicated nor share a common secret key to a symmetric cryptosystem. In contradistinction to an asymmetric key cryptosystem, a public key distribution system permits two remote users to exchange messages back and forth until they arrive at a common key to a symmetric key cryptosystem. The fundamental requirement of an asymmetric key cryptosystem is that an eavesdropper knowing all /f the messages must find it computationally infeasible to compute the common key.

To avoid repetition of background material W. Diffie and M. E. Hellman, "New Directions in Cryptography," *I.E.E.E. Transactions on Information Theory*, Vol. IT-22, No. 6, pp. 644-654 (November 1976) and W. Diffie and M. E. Hellman, "Privacy and Authentication: An Introduction to Cryptography," *Proceedings of the I.E.E.E.*, Vol. 67, No. 3, pp. 397-427 (March 1979) are hereby incorporated by reference.

Returning to the Kerberos system, an eavesdropper on a communications channel utilizing the Kerberos system sees only the person's login ID transmitted in the clear: something that is already public knowledge. The person's password is never explicitly transmitted and the key and subsequent messages are encrypted and hence ostensibly secure. The Kerberos system, however, has a number of limitations and some weaknesses. S. M. Bellovin and M. Meritt, "Limitations of the Kerberos Authentication System," *Proc. Winter USENIX Conference*, Dallas, (1991). People pick bad passwords, and either forget, write down, or resent good ones. This allows an eavesdropper to passively record encrypted messages, and to run a modified brute force attack on a password by decrypting encrypted messages with candidate passwords until intelligible plaintext is created. Kerberos has additional flaws, but illustrates a weakness common to all classical two-party key exchange protocols: the cryptographic passwords are susceptible to off-line, brute-force attacks. Nevertheless, such key exchange protocols may be appropriate when the passwords are long randomly selected strings, but pose considerable difficulty when the passwords are chosen by naive users.

Other attempts at avoiding the problem of off-line password guessing attacks include that described by T. M. A. Lomas, L. Gong, J. H. Saltzer, and R. M. Needham in "Reducing Risks from Poorly Chosen Keys," *Proceedings of the Twelfth ACM Symposium on Operating System Principles*, SIGOPS, 14-18 (December 1989); and L. Gong, "Verifiable-text Attacks in Cryptographic Protocols," *Proc. of the I.E.E.E. INFOCOM—The Conf. on Computer Communications*, (1990). Lomas et al. teach a protocol that frustrates most cryptanalytic attacks but requires, for purposes of authentication, that each party know, in addition to their respective passwords a password, a public key to an asymmetric key cryptosystem. If the public key is to provide any reasonable level of security it cannot be easily memorized.

SUMMARY OF THE INVENTION

The present invention provides a mechanism for establishing private and authenticated communications between parties who share only a relatively insecure secret by using an approach different from the prior art, and while avoiding many of the costs and restrictions of prior cryptographic protocols. The communications conducted pursuant to the present invention are more secure than those established with the prior art and protect the shared secret (e.g., a password) from being revealed to an eavesdropper.

These results are obtained in an illustrative embodiment of the present invention in which a portion of one or more of the messages of a public key distribution system are encrypted with the shared secret as the encryption key. In this regard the illustrative embodiment is similar to the Kerberos system but is substantially different in that the ciphertext is not merely a random number, but a portion of a message of a public key distribution system.

Because an asymmetric key cryptosystem provides a superset of the functionality of a public key distribution system, public key distribution systems are construed to include asymmetric key cryptosystems which are utilized to provide the commensurate functionality of public key distribution systems.

DETAILED DESCRIPTION

1. Notation

The following notation is used throughout:

| | |
|---|---|
| A,B | The parties desiring to communicate (Alice and Bob respectively). |
| P | The password: a shared secret, often used as a key. |
| $P_n$ | A key: typically either P or derived from P. |
| P(X) | The secret key encryption of an argument "X" with key P. |
| $P^{-1}(X)$ | The secret key decryption of an argument "X" with key P. |
| $E_A(X)$ | The asymmetric key encryption of an argument "X" with public key |
| $E_A$. | |
| $D_A(X)$ | The asymmetric key decryption of an argument "X" with private key |
| $D_A$. | |
| $challenge_A$ | A random challenge generated by Alice. |
| $challenge_B$ | A random challenge generated by Bob. |
| R | A session key or a number from which a session key may be derived. |
| p,q | Prime numbers. |

A symmetric key cryptosystem is a conventional cryptosystem as known up until the 1970's; such symmetric key cryptosystems use secret keys. In contradistinction, an asymmetric key cryptosystem uses public encryption and private decryption keys.

As used in the following description and claims, "secure communications" means communications which are authenticated and/or private.

Embodiments of the invention are presented which utilize both public key distribution systems and asymmetric key cryptosystems. As used in the following description and claims, "public key distribution systems" includes asymmetric key cryptosystems providing the functionality of a public key distribution system.

2. Embodiments that Uses Asymmetric Key Cryptosystems

Figure 1:
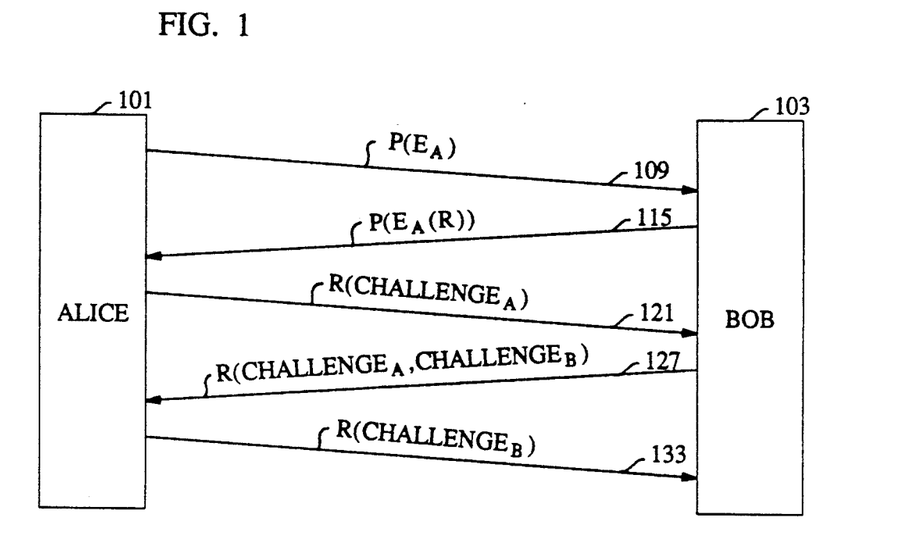
FIG. 1 presents a sequence of messages used in an illustrative embodiment of the invention that utilizes an asymmetric key cryptosystem and where the first two messages are encrypted with a password.

The messages exchanged in an illustrative embodiment of the invention are presented in FIG. 1. That typical embodiment uses an asymmetric key cryptosystem. Alice 101 and Bob 103 are entities who desire to establish private and authenticated communications over a channel. The messages shown may be conveyed by public or private communications paths, e.g., telephone links. In this embodiment, and in each embodiment in the detailed description, Alice and Bob are deemed, prior to the beginning of the message exchange, to share knowledge of the secret P. Additionally, in this embodiment, and in each embodiment in the detailed description, Alice is the calling party and Bob is the called party. Referring to FIG. 1:

1. Alice generates a random public key/private key pair, $E_A$ and $D_A$, and encrypts $E_A$, or a portion thereof, in a symmetric key cryptosystem illustratively of the type described in Data Encryption Standard, Federal Information Processing Standards Publication 46, National Bureau of Standards, U.S. Dept. of Commerce, January 1977, with password P as the key, yielding $P(E_A)$. Alice sends $$P(E_A) \qquad (msg.109)$$

to Bob as shown at 109. This message may include other information such as the identity of the sender, or the remainder of the public key when a portion of it is not encrypted.

2. Bob, knowing P, decrypts msg.109 to obtain $P^{-1}(P(E_A)) = E_A$. Bob then generates a random secret key R, and encrypts it in the asymmetric key cryptosystem with key $E_A$ to produce $E_A(R)$. This string is further encrypted with P. Bob sends $$P(E_A(R)) \qquad (msg.115)$$

to Alice as shown at 115.

3. Alice, knowing P and $D_A$, uses them to obtain $D_A(P^{-1}(P(E_A(R)))) = R$. Thereafter, R, or numbers derived from R, can be used as a key in further communications between Alice and Bob.

2.1. Key Validation Techniques

Once the parties have agreed to a key R, it may, in certain circumstances, be appropriate for the parties to take steps to make sure that the key has not been tampered with during transmission. As used in this description, such steps are known as key validation techniques.

2.1.1. Guarding Against Replay Attacks

The illustrative embodiment outlined in Section 2 above may not be suitable for all applications because it may not adequately guard against replay attacks. A replay attack is an attempt by an eavesdropper, who has control of the communications channel, to insert old, stale, messages in the communication channel in an attempt to impersonate either party. Where the possibility of a replay attack exists, a preferred embodiment of the invention incorporates a mechanism to thwart such an attack. Thus, again referring to FIG. 1 this embodiment comprises the messages:

1. As before, the message exchange begins when Alice 101 sends $$P(E_A) \qquad (msg.109)$$

to Bob 103.

2. Again as before, Bob, responds by sending $$P(E_A(R)) \qquad (msg.115)$$

to Alice.

3. Upon receipt of msg.115 the challenge-response mechanism begins. Alice decrypts msg.115 to obtain R, generates a random string $challenge_A$ and encrypts it with R to produce $R(challenge_A)$. She sends $$R(challenge_A) \qquad (msg.121)$$

to Bob as shown at 121.

4. Bob decrypts msg.121 to obtain $challenge_A$, generates a random string $challenge_B$, encrypts the two challenges with the secret key R and sends $$R(challenge_A, challenge_B) \qquad (msg.127)$$

to Alice as shown at 127.

5. Alice decrypts msg.127 to obtain $challenge_A$ and $challenge_B$, and compares the former against her earlier challenge. When it matches, she encrypts $challenge_B$ with R and sends $$R(challenge_B) \qquad (msg.133)$$

to Bob as shown in 133.

6. Upon receipt of msg.133 Bob decrypts to obtain $challenge_B$ and compares against the earlier challenge. When it matches, the challenge-response mechanism is successful and the parties may use R, or a string derived from R, as a session key in further communications.

The challenge-response portion of the embodiment above could be replaced by other mechanisms for validating R. For example, the time could be exchanged encrypted by R, under the security-critical assumption that clocks are monotonic and, to some extent, synchronized.

2.1.2 Guarding Against Recovered Session Keys

Figure 2:
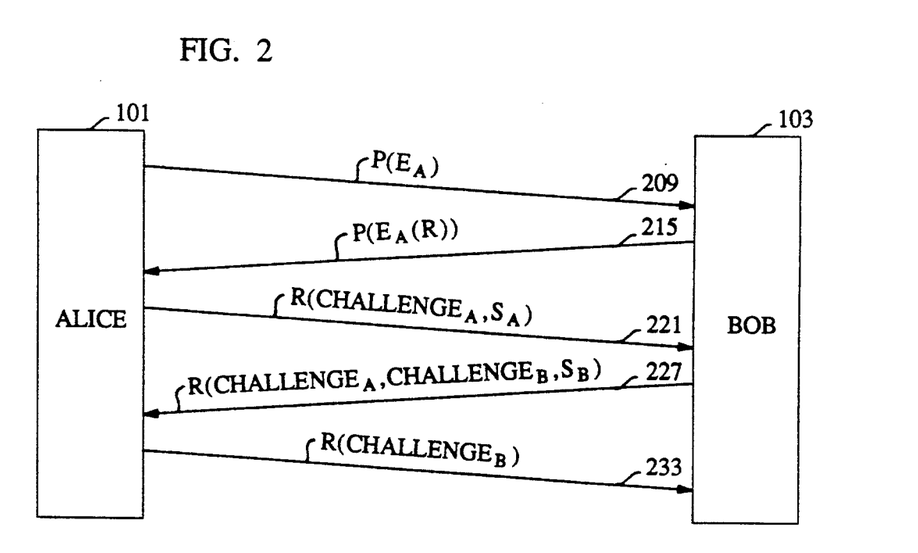
FIG. 2 presents a sequence of messages used in an illustrative embodiment of the invention that provides protection against attacks on the passwords when a session key has been recovered by an attacker.

When a cryptanalyst recovers a session key R he can use R as a clue to attack P and $E_A$. FIG. 2 presents the messages exchanged in an illustrative embodiment of the invention that hinders an attack on P or $E_A$ when R is known. When there is a chance that a unauthorized cryptanalyst might recover a session key another preferred embodiment of the invention incorporates a mechanism to hinder such an attack. Referring to FIG. 2:

1. As before, the message exchange begins when Alice 201 sends $$P(E_A) \qquad (msg.209)$$

to Bob 203.

2. Again as before, Bob, responds by sending $$P(E_A(R)) \qquad (msg.215)$$

to Alice as shown at 215.

3. Alice decrypts msg.215 to obtain R, randomly generates a unique challenge $challenge_A$ and a random subkey $S_A$, encrypts the challenge and the subkey with R and sends $$R(challenge_A, S_A) \qquad (msg.221)$$

to Bob as shown at 221.

4. Upon receipt of msg.221, Bob decrypts it to obtain challenge$_A$ and S$_A$, generates a unique challenge challenge$_B$, and a random subkey S$_B$ and encrypts the two challenges and his subkey with the secret key R and sends $$R(challenge_A, challenge_B, S_B) \qquad (msg.227)$$

to Alice as shown at 227.

5. Upon receipt of msg.227 Alice decrypts it to obtain challenge$_A$ and challenge$_B$, and compares the former against her earlier challenge. When it matches, she encrypts challenge$_B$ with R to obtain R(challenge$_B$). Alice sends $$R(challenge_B) \qquad (msg.233)$$

to Bob as shown in 233.

6. Upon receipt of msg.233, Bob decrypts it to obtain challenge$_B$ and compares it to challenge$_B$ of msg.227. When it matches, the two parties calculate a key, S=f(S$_A$,S$_B$) for some jointly known function f. S is used as the secret key to encrypt all subsequent exchanges and R is reduced to the role of a key exchange key.

Conceivably, a sophisticated cryptanalyst might be able to use the presence of challenges and responses in different messages to attack R. When such an attack is of concern, the responses can be modified to contain a one-way function of the challenges, rather than the challenges themselves. Thus, msg.227 could become $$R(g(challenge_A), challenge_B, S_A)$$

and a similar change would be made to msg.233.

2.2 Bilateral Versus Unilateral Encryption

When a portion of both of the first two messages are encrypted with the password, as are msg.109 and msg.115 in the embodiment presented above, the embodiment incorporates what is called bilateral encryption. In other illustrative embodiments, however, bilateral encryption is not necessary. When only one of the first two messages is encrypted it is called unilateral encryption. Note that there are two types of unilateral encryption: (1) when the first messages is encrypted, and (2) when the second message is encrypted. Section 2.2.1. shown an illustrative embodiment of the invention where only the first message is encrypted with the password and section 2.2.2 presents an illustrative embodiment where only the second message is encrypted.

2.2.1. An Illustrative Embodiment Using The RSA Asymmetric Key Cryptosystem

An illustrative embodiment of the invention uses the asymmetric key cryptosystem known as "RSA" and taught by R. L. Rivest, A. Shamir, and L. Adleman in U.S. Pat. No. 4,405,829, issued Sept. 20, 1983, and in "A Method of Obtaining Digital Signatures and Public Key Cryptosystems," *Communications of the ACM*, Vol. 21, No. 2, 120-26 (February 1978). An overview of RSA is given before the illustrative embodiment is presented.

2.2.1.1. An Overview of RSA

The public key E$_A$ for the RSA cryptosystem consists of a pair of natural numbers <e,n>, where n is the product of two primes p and q, and e is relatively prime to $$\phi(n) = \phi(p)\phi(q) = (p-1)(q-1)$$

where $\phi(n)$ is the Euler Totient function. It is preferred that p and q be of the form 2p'+1 and 2q'+1, respectively, where p' and q' are primes. The private decryption key d is calculated such that $$ed \equiv 1 (mod(p-1)(q-1)).$$

A message m is encrypted by calculating:

$$c \equiv m^e (mod \, n);$$

the ciphertext c is decrypted by $$m \equiv c^d (mod \, n).$$

2.2.1.1. An Illustrative Embodiment Using RSA

Figure 3:
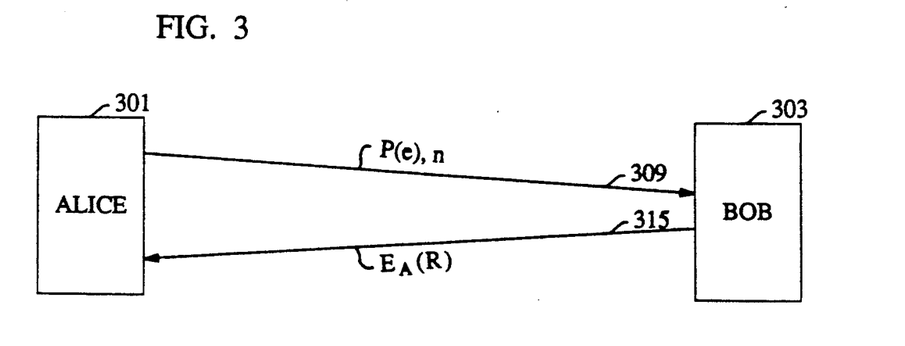
FIG. 3 presents a sequence of messages used in an illustrative embodiment of the invention where only a portion of the initial message is encrypted with the password.

FIG. 3 presents the messages exchanged in an illustrative embodiment of the invention that uses the RSA asymmetric key cryptosystem. Referring to FIG. 3:

1. The message exchange begins when Alice 301 generates a radom public key/private key pair, E$_A$ and D$_A$. E$_A$ comprises the numbers <e,n>. Because n is a prime number it is distinguishable from a random number and must be sent in the clear. To encrypt e, Alice begins with the binary encoding of e and encrypts all of the bits comprising e except the least significant bit in a symmetric cryptosystem with password P. Alice sends $$P(e), n \qquad (msg.309)$$

to Bob as shown at 309.

2. Bob, knowing P, decrypts msg.309 to obtain $P^{-1}(P(e))=e$, generates a random secret key R, and encrypts it in the asymmetric key cryptosystem with key E$_A$ to produce E$_A$(R). In other illustrative embodiments E$_A$(R) may be encrypted with P, but in the preferred embodiment using RSA, it is not. Bob sends $$E_A(R) \qquad (msg.315)$$

to Alice as shown at 315.

3. Upon receipt of msg.315 Alice decrypts it to obtain R. Thereafter, R, or numbers derived from R, can be used as a session key. At this point a key validation technique, such as the challenge-response mechanism may be implemented.

One caveat about sending n in the clear is worth noting; it exposes the password P to the risk of cryptanalysis. More precisely, when n is available to an attacker, it can be factored and then R would be disclosed and P would be exposed to attack.

Figure 4:
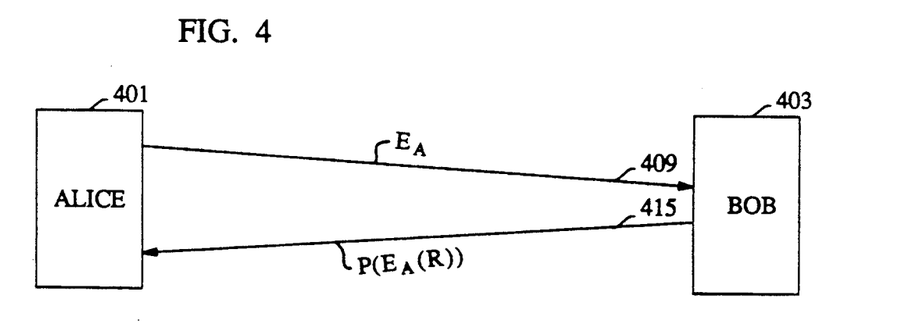
FIG. 4 presents a sequence of messages used in an illustrative embodiment of the invention where only a portion of the reply message is encrypted with the password.

2.2.2. An Illustrative Embodiment Using the El Gamal Asymmetric Key Cryptosystem The El Gamal cryptosystem, T. El Gamal, "A Public Key Cryptosystem and a Signature Scheme Based on Discrete Logarithms," *I.E.E.E. Transactions on Information Theory*, Vol. 31, 469-72 (July 1985), is used in an illustrative embodiment of the invention as shown in FIG. 4. Unlike the embodiment incorporating RSA, under certain circumstances, an embodiment incorporating the El Gamal cryptosystem must encrypt the second message, rather than the first.

2.2.2.2. An Overview of the El Gamal Asymmetric Key Cryptosystem

When Bob desires to send an encrypted message (e.g., the key R) to Alice, Bob must notify that he desires to do so. When Alice agrees to receive the encrypted message Alice and Bob then agree on a common base $\alpha$ and modulus $\beta$. Alice then picks a random number $R_A$ in the interval $[0,\beta-1]$ and computes $\alpha^{R_A}(\bmod\beta)$. Next Alice sends $\alpha^{R_A}(\bmod\beta)$ in the clear to Bob who also picks a randon number $R_B$ in the interval $[0,\beta-1]$ and computes $$c_1 = \alpha^{R_B}(\bmod\beta),$$

$$K = (\alpha^{R_A}(\bmod\beta))^{R_B}(\bmod\beta) = \alpha^{R_A R_B}(\bmod\beta)$$

and $$c_2 = R \cdot K (\bmod\beta)$$

The encrypted message that Bob sends to Alice consists of the pair $<c_1,c_2>$.

Alice, knowing $R_A$ and $\alpha^{R_B}(\bmod\beta)$ decrypts the message to recover R by calculating $$K = (\alpha^{R_B}(\bmod\beta))^{R_A}(\bmod\beta) = \alpha^{R_A R_B}(\bmod\beta)$$

and then dividing $c_2$ by K.

2.2.2.3. An Illustrative Embodiment Using the El Gamal Cryptosystem

The messages exchanged in an illustrative embodiment of the invention that uses the El Gamal asymmetric key cryptosystem is presented in FIG. 4. Prior to the first message Alice and Bob are deemed to have agreed to values for base $\alpha$ and modulus $\beta$. Referring to FIG. 4:

1. Alice 401 generates a random number $R_A$ and computes $\alpha^{R_A}(\bmod\beta)$. Although Alice may encrypt $\alpha^{R_A}(\bmod\beta)$ it is not encrypted in the preferred embodiment. Alice sends $$\alpha^{R_A}(\bmod\beta) \qquad (msg.409)$$

to Bob 403 as shown at 409. This message may include other information such as the identity of the sender.

2. When Bob receives msg.409 he generates a random number $R_B$ such that $\alpha^{R_B}(\bmod\beta)$ is randomly selected from the interval $[0,\beta-1]$. Bob also generates a random session key R and computes $R\alpha^{R_A R_B}(\bmod\beta)$. Bob sends $$P(\alpha^{R_B}(\bmod\beta), R\alpha^{R_A R_B}(\bmod\beta)) \qquad (msg.415)$$

to Alice as shown at 415.

3. Alice, knowing P recovers $\alpha^{R_A}(\bmod\beta)$ and consequently R. After receipt of msg.415, one of the key validation techniques may be begun. Thereafter, R, numbers derived from R, or a number derived from a validation technique can be used as a session key.

2.5 Security Considerations 2.5.1 Partition Attacks

The principal constraint on any embodiment is that encryptions using P must leak no information. For some cryptosystems this is difficult. For example, the public keys in RSA are always odd. When no special precautions are taken, an attacker could rule out half of the candidate values $P'$ when $P'^{-1}(P(e))$ is an even number. Upon first inspection, this is an unimportant reduction in the key space; however, when left uncorrected, it can compromise the security of the embodiment. As used in this description, the term "key space" is the range of possible cryptographic keys. When the key space is large an unauthorized cryptanalyst attempts to "reduce the key space" or eliminate impossible cryptographic keys. By the process of elimination the cryptanalyst can, when given sufficient clues such as the one shown above, reduce the key space down to reveal the actual key.

Recall that each session uses a different public key, independent of all others previously used. Thus, trial decryptions resulting in illegal values of $e'$ exclude different values of $P'$ each time. In other words, each time a session key is negotiated an attacker can partition the remaining candidate key space into two approximately-equal halves. The keyspace is thus logarithmically reduced; comparatively few intercepted conversations will suffice to reject all invalid guesses at P. This attack is called a partition attack.

For some cryptosystems, a minimal partition may be acceptable. Consider a situation where integers modulo some prime p must be encrypted with P. When n bits are used to encode p, trial decryptions yielding values in the range $[p, 2^n-1]$ can be used to partition the password space. However, when p is close to $2^n$, perhaps even $2^n-1$, few candidate passwords are excluded by each session. Consequently, p equal to $2^n-1$ is preferred while conversely values of p far from $2^n-1$ are not preferred.

Another danger comes from trying to encrypt a number with a cryptosystem that demands a blocksize larger than the number. The blocksize of a cryptosystem is the amount of plaintext that the cryptosystem can encrypt in a single encryption. The number should be padded with random data to bring the total string up to the blocksize of the cryptosystem.

Note that both problems may be eliminated in one operation. Again, assume that one is encrypting integers modulo p. Further assume that the desired input encryption block size is m bits where $2^m > p$. Let $$q = \left[\frac{2^m}{p}\right].$$

The value q is the number of times p fits into the encryption block size. Therefore choose a random value $j\xi[0, q-1]$ and add jp to the input value using non-modulo arithmetic (when the input value is less than $2^m-qp$, use the interval $[0, q]$ instead). The recipient, knowing the modulus, recovers the decrypted value to the proper range by dividing the input plus jp by $\beta$ and taking the remainder.

3. Illustrative Embodiments That Use Public Key Distribution Systems

An illustrative embodiment of the invention uses the public key distribution system known as "Diffe-Hellman" and taught by M. E. Hellman, W. Diffe and R. C. Merkle in U.S. Pat. No. 4,200,770, Apr. 29, 1980, and in W. Diffie and M. E. Hellman, "New Directions in Cryptography," *I.E.E.E. Transactions on Info. Theory*, Vol. 22, No. 6 (November 1976).

3.1. An Overview of Diffie-Hellman

Diffie-Hellman is not a cryptosystem. It is, however, a mechanism for publicly generating a secure key (e.g., a session key) for a symmetric cryptosystem. Briefly, Alic and Bob each pick random exponents $R_A$ and $R_B$. Assuming they agree on a common base $\alpha$ and modulus $\beta$, Alice computes $\alpha^{R_A}(\bmod\beta)$ and Bob computes $\alpha^{R_B}(\bmod\beta)$. Each party transmits their computed quantity in the clear to the other party. Alice, knowing $R_A$ and $\alpha^{R_B}(\bmod\beta)$, computes $$R \equiv (\alpha^{R_B}(\text{mod}\,\beta))^{R_A}(\text{mod}\,\beta) \equiv \alpha^{R_A R_B}(\text{mod}\,\beta).$$

Similarly, Bob, knowing $R_B$ and $\alpha^{R_A}$ (mod $\beta$) computes $$R \equiv (\alpha^{R_A}(\text{mod}\,\beta))^{R_B}(\text{mod}\,\beta) \equiv \alpha^{R_A R_B}(\text{mod}\,\beta).$$

The quantity R can then be used as the key in further communications between Alice and Bob. An intruder, knowing only $\alpha^{R_A}$ (mod $\beta$) and $\alpha^{R_B}$ (mod $\beta$), cannot perform the same calculation. It should be noted, however, that Diffie-Hellman does not provide authentication and is therefore vulnerable to active wiretaps.

3.2. An Illustrative Embodiment Using Diffie-Hellman

Figure 5:
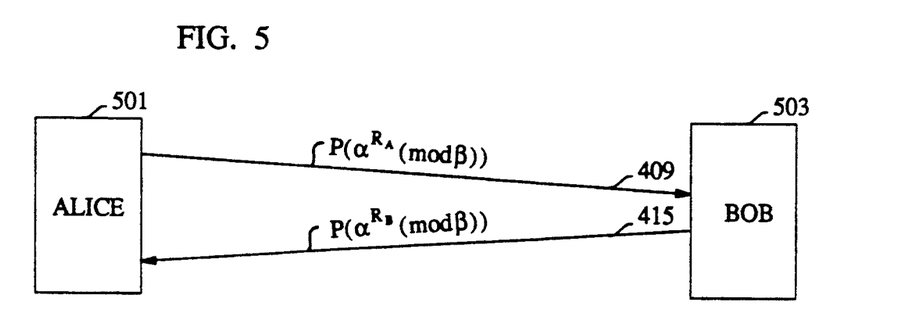
FIG. 5 presents a sequence of messages used in an illustrative embodiment of the invention that utilizes a public key distribution system.

FIG. 5 presents the messages exchanged in an embodiment of the invention as used in connection with the Diffie-Hellman public key distribution system. Referring to FIG. 5:

1. Assuming that Alice 501 and Bob 503 agree on a common base $\alpha$ and modulus $\beta$, Alice generates a random number $R_A$ and computes $\alpha^{R_A}$ (mod $\beta$). $\alpha^{R_A}$ (mod $\beta$) is encrypted in a summetric key cryptosystem with the password P as the key and Alice sends $$P(\alpha^{R_A}(\text{mod}\,\beta)) \qquad (\text{msg.}509)$$

to Bob as shown at 509. Note that if $R_A$ is random, $\alpha^{R_A}$ (mod $\beta$) is random and guesses at P will yield no useful information.

2. Similarly, Bob generates a random number $R_B$ and sends $$P(\alpha^{R_B}(\text{mod}\,\beta)) \qquad (\text{msg.}515)$$

to Alice as shown at 515. At this point both Alice and Bob know both $\alpha^{R_A}(\text{mod}\,\beta)$ and $\alpha^{R_B}(\text{mod}\,\beta)$ and can therefore calculate a session key as shown in Section 3.1. Additionally, one of the key validation techniques may be commenced once a common value is computed by both Alice and Bob.

3.3. Bilateral Versus Unilateral Encryption

Typically both messages of the Diffie-Hellman public key distribution system are not encrypted. Unilateral encryption, the encryption of a portion of at least one of the messages of the Diffie-Hellman public key distribution system, will assure privacy and authentication. Therefore, referring to FIG. 5 it is possible to omit the encryption of either one, but not both, of the messages in FIG. 5. For example, msg.509 can be replaced by $$\alpha^{R_A}(\text{mod}\,\beta)$$

Alternatively msg.515 can be replaced by $$\alpha^{R_B}(\text{mod}\,\beta)$$

That unilateral encryption preserves the security of the system means that one pair of encryptions and decryptions can be omitted. Since encryption and decryption can require substantial computing resources and time those resources can be omitted and time can be saved.

3.4 Choosing $\alpha$ and $\beta$ $\alpha$ and $\beta$ can be chosen from among different values, each of which choices reflects a tradeoff between cost and security. Although there are a number of possible choices for the modulus, large prime values of $\beta$ are more secure. Furthermore, it is desirable that $\alpha$ be a primitive root of the field GF($\beta$). When $\beta$ is chosen such that $$\beta = 2p+1$$

for some prime p, there are $(\beta-1)/2 = p$ such values; hence, they are easy to find. Assume those restrictions in the discussion that follows.

It is somewhat problematic for Alice and Bob to agree to common values for $\alpha$ and $\beta$ without revealing information to an attacker. P($\beta$) cannot be transmitted because testing a random number for primality is too easy. In one embodiment, $\alpha$ and $\beta$ are fixed and made public. This embodiment has the advantage that there is no risk of information leakage or partition attacks. The disadvantage is that implementation become less flexible, as all parties must agree on such values. A further disadvantage to making $\beta$ public is that to maintain security, $\beta$ must be large which in turn makes the exponentiation operations expensive.

Some compromise is the length of the modulus is possible, however. Because in the embodiment the password P is used to superencrypt such values; it is not possible to essay a discrete logarithm calculation except for all possible guesses of P. The goal then is to select a size for $\beta$ sufficient to make guessing attacks far too expensive. Using 200 bits, for which discrete logarithm solutions are estimated to take several minutes even after the tables are built, might suffice.

Another consideration inclines one towards larger moduli, however. When the user's password is compromised, recorded exponentials will be available to the attacker; these, when solved, will permit reading of old conversations. When a large modulus value is chosen, all such conversations would remain secure.

Size requirements for $\beta$ are derived from a desire to prevent calculations of discrete logarithms in the field GF($\beta$). The current best algorithms for such calculations require large amounts of precalculation. When a different $\beta$ is used each time, an attacker cannot build tables in advance; thus, a much smaller, and hence cheaper, modulus can be used. Therefore, in the preferred embodiment Alice generates random values of $\beta$ and $\alpha$, and transmits them in cleartext during the initial exchange. There is little security risk associated with an attacker knowing these values; the only problem would be with cut-and-paste attacks. And even this risk is minimal when Bob performs certain checks to guard against easily-solvable choices: that $\beta$ is indeed prime, that it is large enough (and hence not susceptible to precalculation of tables), that $\beta-1$ have at least one large prime factor, and that $\alpha$ is a primitive root of GF($\beta$). The latter two conditions are related; the factorization of $\beta-1$ must be known in order to validate $\alpha$. When $\beta$ is of the from $kp+1$, where p is prime and k a very small integer, both conditions are satisfied.

Thus far, nothing has been said about choosing $\alpha$. But when a suitable value of $\beta$ is chosen, $\alpha$ is chosen as a primitive root of $\beta$. There is no reason not to examine the integers starting with 2; the density of primitive roots guarantees that one will be found quite quickly.

4. The Cryptosystems 4.1. Selecting a Symmetric Key Cryptosystem

Symmetric key encryption is used three times in various embodiments: to encrypt the initial asymmetric key exchange, to trade challenges and responses, and to protect the ensuing application session. In general, the same symmetric key cryptosystem can be used at all three points.

In the initial exchange (e.g., msg.109 and msg.115), there are severe constraints on the plaintext. The messages advantageously should not use any other form of tagged data representation.

In all preferred embodiments, the original plaintext message should not contain any non-random padding to match the encryption blocksize, nor any form of error-detecting checksum. Protection against communications errors is typically provided by lower-layer protocols. While cipher block chaining or some similar scheme may be employed to tie together multiple blocks and hinder cryptanalytic attacks, such mechanisms are not typically important because the transmitted bits are random and hence cannot profitably be manipulated by an attacker. The challenge/response mechanism provides the necessary defense against such manipulation of the messages.

In one embodiment, the encryption algorithm may be as simple an operation as the bit-wise boolean XOR-ing of the password with the public key.

Similarly, the key validation messages typically do not need to be protected by a strong cipher system. However, it has been tacitly assumed that it is not feasible for an attacker to perform useful cut-and-past operations on encrypted messages. For example, when it is said that Alice sends R(challenge$_A$, challenge$_B$) to Bob, and that Bob replies with R(challenge$_A$), one might conclude that the attacker could snip out R(challenge$_A$) from the first message, and simply echo it in the second. In all preferred embodiments this advantageously should be prevented, of course. Thus, when necessary in the particular cyrptosystem being used, standard techniques such as cipher block chaining should be employed. Cipher block chaining should prevent such "snip and echo" or "cut and paste" attacks. Alternatively, Alice and Bob could use R to derive distinct subkeys R$_A$ and R$_B$, each used in only one direction. Other alternative include employing message typing or adding message authentication codes; however, these may introduce redundancy undesirable in the face of a cryptanalytic attack. In such situations, the one-way functions mentioned in Section 2.1.2. may be preferable.

Finally, the use of R in the ensuing login session must not reveal useful information about R. When the system is cryptanalyzed and when R is recovered, the attacker can then mount a password-guessing attack on the message exchange. Furthermore, since this protocol is applicable to protecting arbitrary sessions between parties, it is best to be cautious, and examine the particular symmetric system under the assumption that the adversary may mount chosen-ciphertext attacks against the session. When there is any doubt, the separate data key exchange key embodiment is preferred.

4.2 Selecting a Public Key Distribution System

In principle, any public key distribution system can be used including Merkle's Puzzles, R. C. Merkle, "Secure Communications Over Insecure Channels," *Communications of the ACM*, Vol. 21, 294–99 April 1978). In practice, some systems may be ruled out on practical grounds. For example, a system that used many large primes might be infeasible in some applications. RSA uses at least two such primes; dynamic key generation might prove too complex and therefore too expensive for some hardware systems.

A second consideration is whether or not a particular system's public keys can be encoded as a random-seeming bit string. It has already been demonstrated how this can be an issue with RSA.

It is tempting to finesse the issue by instead transmitting the seed of the random number generator used to produce the public key. Unfortunately, that may not be applicable in many cases. Apart from the expense involved—both sides would have to go through the time-consuming process of generating the keys—the random seed will yield both the public and private keys. And that in turn would allow an attacker to validate a candidate password by retrieving the session key.

The option of transmitting the seed of a random number generator works with exponential key exchange. Since the prime modulus may be public anyway, there is nothing to be concealed. Unfortunately, the option necessitates both parties to go through the step of generating large prime numbers, albeit while saving on the size modulus required. The tradeoff may be worth reconsidering when very fast solutions to the discrete logarithm problem are found.

5. The Apparatus to Carry Out the Message Exchange

Figure 6:
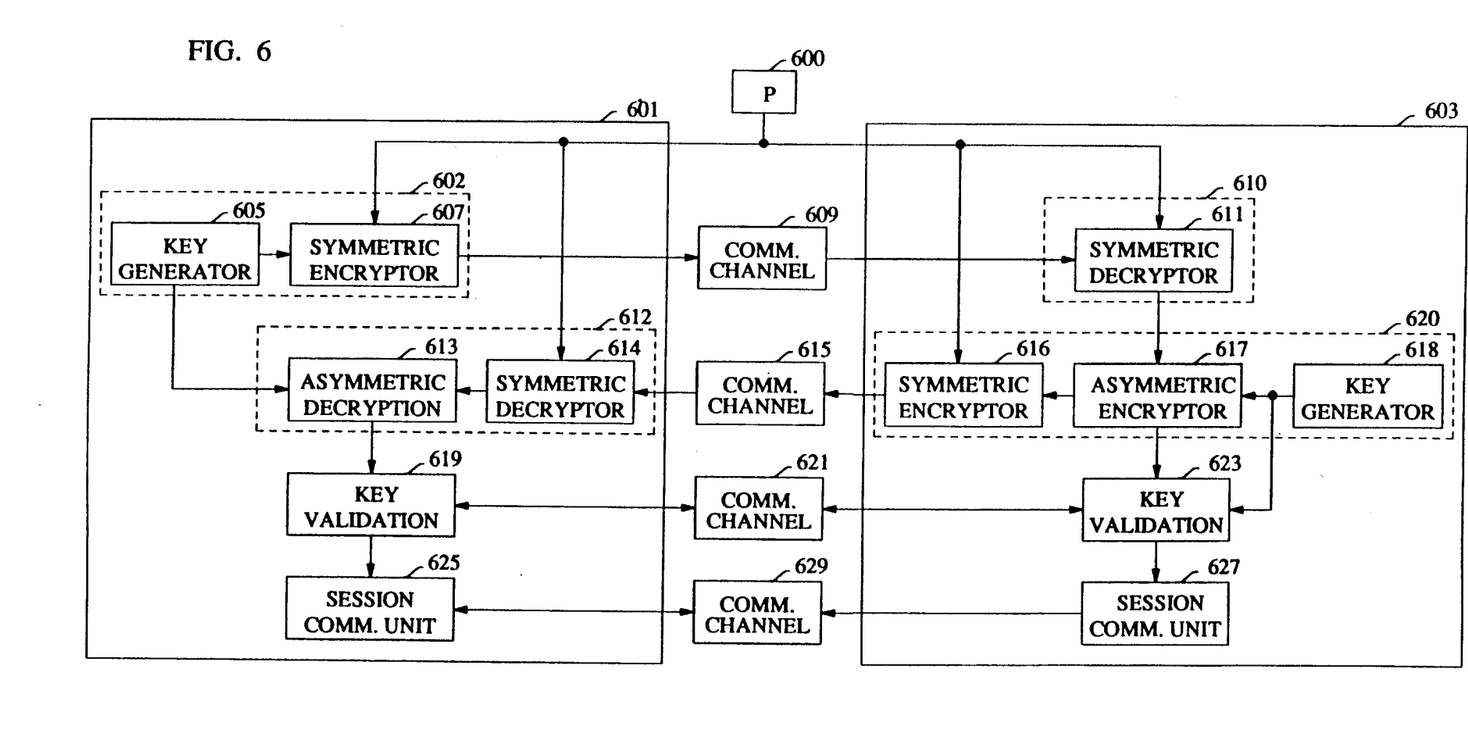
FIG. 6 presents an apparatus that utilizes an asymmetric key cryptosystem and where the first two messages are encrypted.

FIG. 6 presents an illustrative embodiment of an apparatus which can carry out the message exchange described in Section 2. This embodiment can be easily modified by a person having ordinary skill in the art to perform any embodiment of the invention.

Alice 601 and Bob 603 are two computers, or other standard processing and communications stations or equipment, who share a secret P, which may be stored in a register or the like 600, and desire to establish a private and authenticated communication channel 629. The secret P is stored in a register or the like in both Alice and Bob. Alice comprises a transmitter 602, a receiver 612, an key validator 619 and a session communication unit 625. The transmitter 602 accepts as input the secret P. The transmitter 602 contains an asymmetric key generator 605 which generates a public key and a private key. The public key is passed to a symmetric key encryptor 607. The symmetric key encryptor 607 also accepts as input the secret P and encrypts the public key, or a portion thereof, with the secret P as the key to form an initiating message. The initiating message is passed from the symmetric key encryptor 607 to a communications channel 609 where it is transmitted to a receiver 610 in Bob.

The receiver 610 comprises a symmetric key decryptor 611. The symmetric key decryptor 611 accepts as input the initiating message and the secret P and decrypts the initiating message to recover the public key. The public key is passed to the transmitter 620. The transmitter 620 comprises a symmetric key encryptor 616, an asymmetric key encryptor 617 and a symmetric key generator 618. The symmetric key generator 618 generates a random symmetric key which is passed to the asymmetric key encryptor 617. The asymmetric key encryptor 617 also accepts as input the public key from the receiver 610 and encrypts the symmetric key with the public key to form an encrypted key. The encrypted key is passed to the symmetric key encryptor 616, which also accepts as input the secret P, where the encrypted key is further encrypted with the secret P to form a response message. The response message is passed from the symmetric key encryptor 616 to a communication channel 615 where it is transmitted to a receiver 612 in Alice.

The receiver 612 comprises a symmetric key decryptor 614 and an asymmetric key decryptor 613. The symmetric key decryptor 614 accepts as input the secret P and the response message, decrypts the response message to recover the encrypted key and passes it to the asymmetric key decryptor 613. The asymmetric key decryptor 613 also accepts as input the private key passed from the asymmetric key generator 605 and uses it to decrypt the encrypted key to recover the symmetric key. The symmetric key is passed from the asymmetric key decryptor 613 to the key validator 619. Analogously, in Bob, the key generator 618 passes the symmetric key to Bob's key validator 623. Alice's key generator 619 and Bob's key generator 623 communicate with each other via a communications channel 621 to validate the symmetric key. The purpose of validating the key is to assure that neither Alice nor Bob are being impersonated by an unauthorized eavesdropper who may have discovered the secret P.

Upon validation, Alice's key validator 619 passes the symmetric key to the session communication unit 625 which uses the key in further communications with Bob over communications channel 629. While the communications channels 609, 615, 621 and 629 are shown for simplicity of explosion as separate channels, it should be understood that in practice two or more of these channels may be the same physical channel suitably multiplexed in accordance with well known principles and practice. Analogously, Bob's key validator 623 passes the symmetric key to a session communication unit 627 which uses the key in further communications with Alice over communications channel 629.

6. APPLICATIONS

Embodiments of the invention can be used for secure public telephones. When someone wishes to use a secure public telephone, some keying information will typically be provided. Conventional solutions require that the caller posses a physical key. Embodiments of the invention permits use of a short, keypad-entered password, but uses a much longer session key for the call.

Embodiments of the present invention can be used with cellular telephones. Fraud has been a problem in the cellular industry; embodiments of then can defend against fraud (and ensure the privacy of the call) by rendering a telephone useless when a PIN or other key has not been entered. Since the PIN or other key is not stored within the telephone, it is not possible to retrieve one from a stolen unit.

Embodiments of the invention also provide a replacement of Rivest and Shamir's Interlock Protocol, R. L. Rivest and A. Shamir, "*How to Expose Eavesdropper*," *Communications of the ACM*, Vol. 27, No. 4, 393-95 (1984).

What is claimed is:

1. A method for generating a cryptographic key to a first symmetric key cryptosystem by using an authentication signal, said authentication signal being available to a plurality of parties, said method comprising the steps of:

forming an outgoing signal by encrypting at least a portion of an excitation signal with a second symmetric key cryptosystem using a key based on said authentication signal, said excitation signal being based on a first signal, $R_A$;

transmitting said outgoing signal to one of said parties;

receiving a response signal, Q, in response to said outgoing signal; and generating said cryptographic key based on said first signal and on said response signal.

2. The method of claim 1 wherein said first symmetric key cryptosystem and said second symmetric key cryptosystem are identical.

3. The method of claim 1 wherein said step of forming an excitation signal comprises the step of setting said excitation signal to $\alpha^{R_A}$ modulo $\beta$, where $\alpha$ and $\beta$ are numbers.

4. The method of claim 3 wherein said step of generating said cryptographic key comprises the step of setting said cryptographic key to $Q^{R_A}$ modulo $\beta$.

5. A method for generating a cryptographic key to a first symmetric key cryptosystem by using an authentication signal, said authentication signal being available to a plurality of parties, said method comprising the steps of:

forming an excitation signal based on a first signal, $R_A$;

transmitting said excitation signal;

receiving an incoming signal from one of said parties in response to said excitation signal;

forming a response signal, Q, by decrypting said incoming signal with a second symmetric key cryptosystem using a key based on said authentication signal; and generating said cryptographic key based on said first signal and on said response signal.

6. The method of claim 5 wherein said first symmetric key cryptosystem and said second symmetric key cryptosystem are identical.

7. The method of claim 5 wherein said step of forming an excitation signal comprises the step of setting said excitation signal to $\alpha^{R_A}$ modulo $\beta$, where $\alpha$ and $\beta$ are numbers.

8. The method of claim 7 wherein said step of generating said cryptographic key comprises the step of setting said cryptographic key to $Q^{R_A}$ modulo $\beta$.

9. A method for generating a cryptographic key to a first symmetric key cryptosystem by using an authentication signal, said authentication signal being available to a plurality of parties, said method comprising the steps of:

forming an outgoing signal by encrypting at least a portion of an excitation signal with a second symmetric key cryptosystem using a key based on said authentication signal, said excitation signal being based on a first signal, $R_A$;

transmitting said outgoing signal to one of said parties;

receiving an incoming signal from one of said parties in response to said outgoing signal;

forming a response signal, Q, by decrypting said incoming signal with a third symmetric key cryptosystem using a key based on said authentication signal; and generating said cryptographic key based on said first signal and on said response signal.

10. The method of claim 9 wherein said first symmetric key cryptosystem, said second symmetric key cryptosystem and said third symmetric key cryptosystem are identical.

11. The method of claim 9 wherein said step of forming an excitation signal comprises the step of setting said excitation signal to $\alpha^{R_A}$ modulo $\beta$, where $\alpha$ and $\beta$ are numbers.

12. The method of claim 11 wherein said step of generating said cryptographic key comprises the step of setting said cryptographic key to $Q^{R_A}$ modulo $\beta$.

13. A method for generating a cryptographic key to a first symmetric key cryptosystem by using an authentication signal, said authentication signal being available to a plurality of parties, said method comprising the steps of:

receiving an incoming signal from one of said parties;

forming an excitation signal, S, by decrypting said incoming signal with a second symmetric key cryptosystem using a key based on said authentication signal;

forming a response signal based on a first signal, $R_B$;

transmitting said response signal; and generating said cryptographic key based on said excitation signal and on said first signal.

14. The method of claim 13 wherein said first symmetric key cryptosystem and said second symmetric key cryptosystem are identical.

15. The method of claim 13 wherein said step of forming a response signal comprises the step of setting said response signal to $\alpha^{RB}$ modulo $\beta$, where $\alpha$ and $\beta$ are numbers.

16. The method of claim 15 wherein said step of generating said cryptographic key comprises the step of setting said cryptographic key to $S^{RB}$ modulo $\beta$.

17. A method for generating a cryptographic key to a first symmetric key cryptosystem by using an authentication signal, said authentication signal being available to a plurality of parties, said method comprising the steps of:

receiving an excitation signal, S;

forming a response signal based on a first signal $R_B$;

forming an outgoing signal by encrypting at least a portion of said response signal with a second symmetric key cryptosystem using a key based on said authentication signal;

transmitting said outgoing signal to one of said parties; and generating said cryptographic key based on said excitation signal and on said first signal.

18. The method of claim 17 wherein said first symmetric key cryptosystem and said second symmetric key cryptosystem are identical.

19. The method of claim 17 wherein said step of forming a response signal comprises the step of setting said response signal to $\alpha^{RB}$ modulo $\beta$, where $\alpha$ and $\beta$ are numbers.

20. The method of claim 19 wherein said step of generating said cryptographic key comprises the step of setting said cryptographic key to $S^{RB}$ modulo $\beta$.

21. A method for generating a cryptographic key to a first symmetric key cryptosystem by using an authentication signal, said authentication signal being available to a plurality of parties, said method comprising the steps of:

receiving an incoming signal from one of said parties;

forming a excitation signal, S, by decrypting said incoming signal with a second symmetric key cryptosystem using a key based on said authentication signal;

forming a response signal based on a first signal $R_B$;

forming an outgoing signal by encrypting at least a portion of said response signal with a third symmetric key cryptosystem using a key based on said authentication signal;

transmitting said outgoing signal to one of said parties; and generating said cryptographic key based on said excitation signal and on said first signal.

22. The method of claim 21 wherein said first symmetric key cryptosystem, said second symmetric key cryptosystem and said third symmetric key cryptosystem are identical.

23. The method of claim 21 wherein said step of forming a response signal comprises the step of setting said response signal to $\alpha^{RB}$ modulo $\beta$, where $\alpha$ and $\beta$ are numbers.

24. The method of claim 23 wherein said step of generating said cryptographic key comprises the step of setting said cryptographic key to $S^{RB}$ modulo $\beta$.

25. A method for generating a cryptographic key to a first symmetric key cryptosystem by using an authentication signal, said authentication signal being available to a plurality of parties, said method comprising the steps of:

generating a public key and a private key to a public key cryptosystem;

forming an outgoing signal by encrypting at least a portion of said public key with a second symmetric key cryptosystem using a key based on said authentication signal;

transmitting said outgoing signal to one of said parties;

receiving a response signal in response to said outgoing signal; and generating said cryptographic key based on said response signal and on said private key.

26. The method of claim 25 wherein said first symmetric key cryptosystem and said second symmetric key cryptosystem are identical.

27. The method of claim 25 further comprising the step of validating said cryptographic key.

28. A method for generating a cryptographic key to a first symmetric key cryptosystem by using an authentication signal, said authentication signal being available to a plurality of parties, said method comprising the steps of:

generating a public key and a private key to a public key cryptosystem;

transmitting said public key;

receiving an incoming signal from one of said parties in response to said public key;

forming a response signal by decrypting said incoming signal with a second symmetric key cryptosystem using a key based on said authentication signal; and generating said cryptographic key based on said response signal and on said private key.

29. The method of claim 28 wherein said first symmetric key cryptosystem and said second symmetric key cryptosystem are identical.

30. The method of claim 28 further comprising the step of validating said cryptographic key.

31. A method for generating a cryptographic key to a first symmetric key cryptosystem by using an authentication signal, said authentication signal being available to a plurality of parties, said method comprising the steps of:

generating a public key and a private key to a public key cryptosystem;

forming an outgoing signal by encrypting at least a portion of said public key with a second symmetric key cryptosystem using a key based on said authentication signal;

transmitting said outgoing signal to one of said parties;

receiving an incoming signal from one of said parties in response to said public key;

forming a response signal by decrypting said incoming signal with a third symmetric key cryptosystem using a key based on said authentication signal; and generating said cryptographic key based on said response signal and on said private key.

32. The method of claim 31 wherein said first symmetric key cryptosystem, said second symmetric key cryptosystem, and said third symmetric key cryptosystem are identical.

33. The method of claim 31 further comprising the step of validating said cryptographic key.

34. A method for generating a cryptographic key to a first symmetric key cryptosystem by using an authentication signal, said authentication signal being available to a plurality of parties, said method comprising the steps of:

receiving an incoming signal from one of said parties;

forming a public key to a public key cryptosystem by decrypting said incoming signal with a second symmetric key cryptosystem using a key based on said authentication signal;

generating said crytographic key;

forming a response signal by encrypting at least a portion of said cryptographic key with a public key cryptosystem using said public key; and transmitting said response signal.

35. The method of claim 34 wherein said first symmetric key cryptosystem and said second symmetric key cryptosystem are identical.

36. The method of claim 34 further comprising the step of validating said cryptographic key.

37. A method for generating a cryptographic key to a first symmetric key cryptosystem by using an authentication signal, said authentication signal being available to a plurality of parties, said method comprising the steps of:

receiving a public key to a public key cryptosystem;

generating said cryptographic key;

forming a response signal by encrypting at least a portion of said cryptographic key with a public key cryptosystem using said public key;

forming an outgoing signal by encrypting at least a portion of said response signal with a second symmetric key cryptosystem using a key based on said authentication signal; and transmitting said outgoing signal to one of said parties.

38. The method of claim 37 wherein said first symmetric key cryptosystem and said second symmetric key cryptosystem are identical.

39. The method of claim 37 further comprising the step of validating said cryptographic key.

40. A method for generating a cryptographic key to a first symmetric key cryptosystem by using an authentication signal, said authentication signal being available to a plurality of parties, said method comprising the steps of:

receiving an incoming signal from one of said parties;

forming a public key to a public key cryptosystem by decrypting said incoming signal with a second symmetric key cryptosystem using a key based on said authentication signal;

generating said cryptographic key;

forming a response signal by encrypting at least a portion of said cryptographic key with a public key cryptosystem using said public key;

forming an outgoing signal by encrypting at least a portion of said response signal with a third symmetric key cryptosystem using a key based on said authentication signal; and transmitting said outgoing signal to one of said parties.

41. The method of claim 40 wherein said first symmetric key cryptosystem, said second symmetric key cryptosystem, and said third symmetric key cryptosystem are identical.

42. The method of claim 40 further comprising the step of validating said cryptographic key.

* * * * *